July 21, 1931.  A. RONNING ET AL  1,815,273
COMBINATION TRACTOR IMPLEMENT
Original Filed July 5, 1924    3 Sheets-Sheet 3
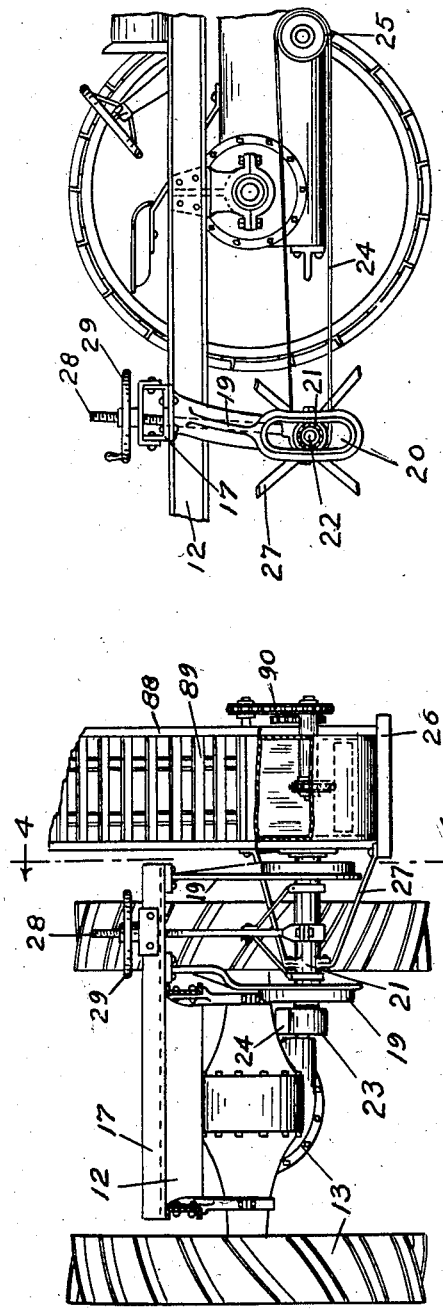
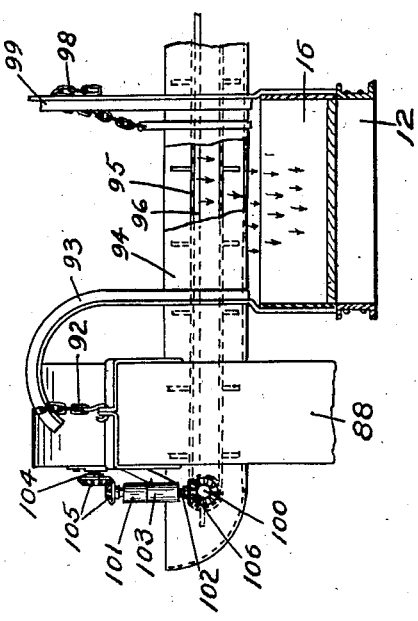
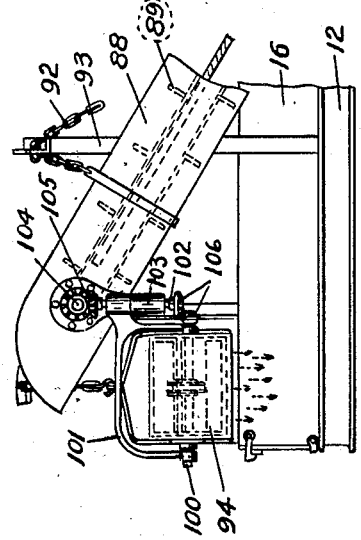
INVENTORS
ANDREAN G. RONNING
ADOLPH RONNING
BY
ATTORNEY Patented July 21, 1931

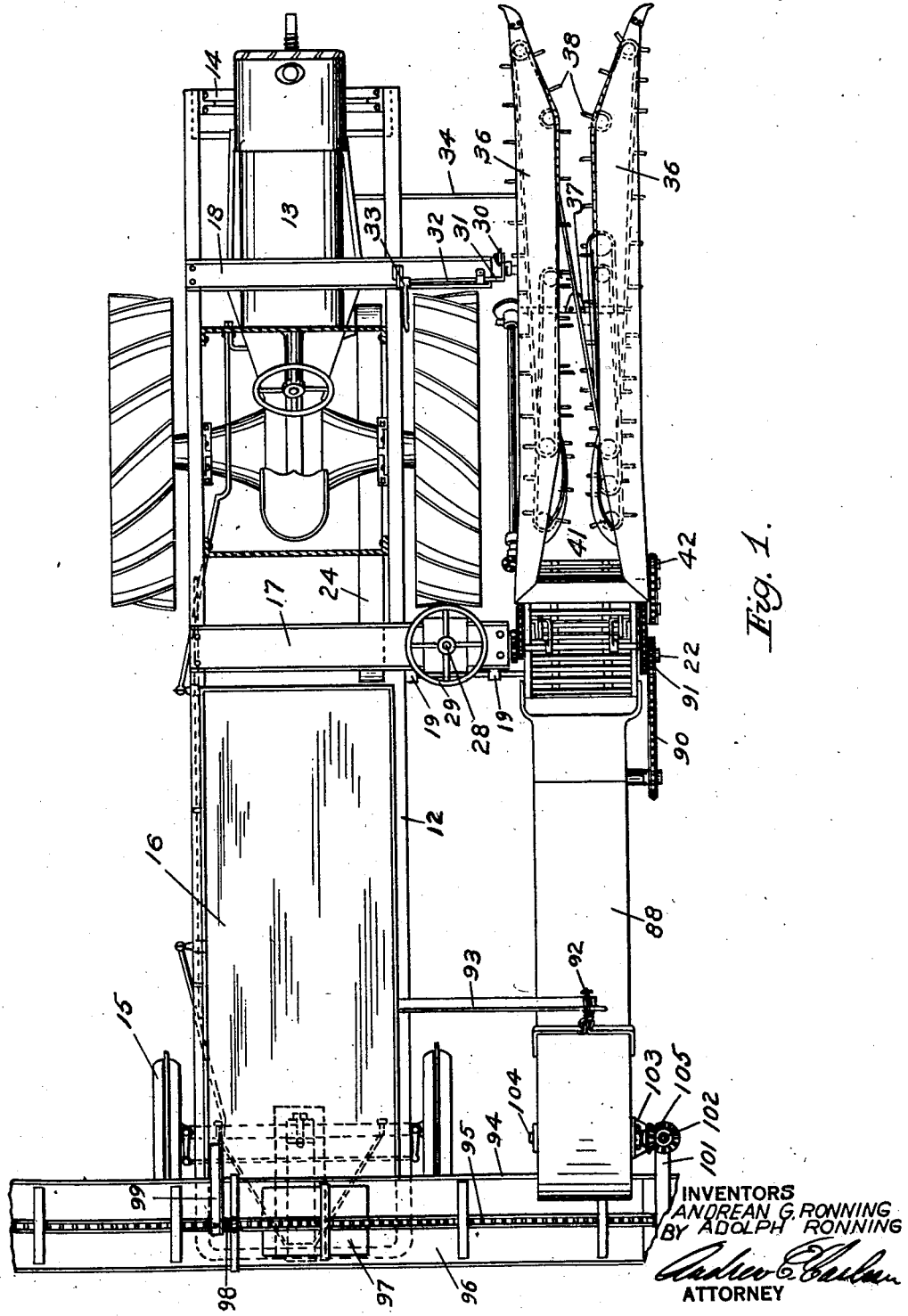

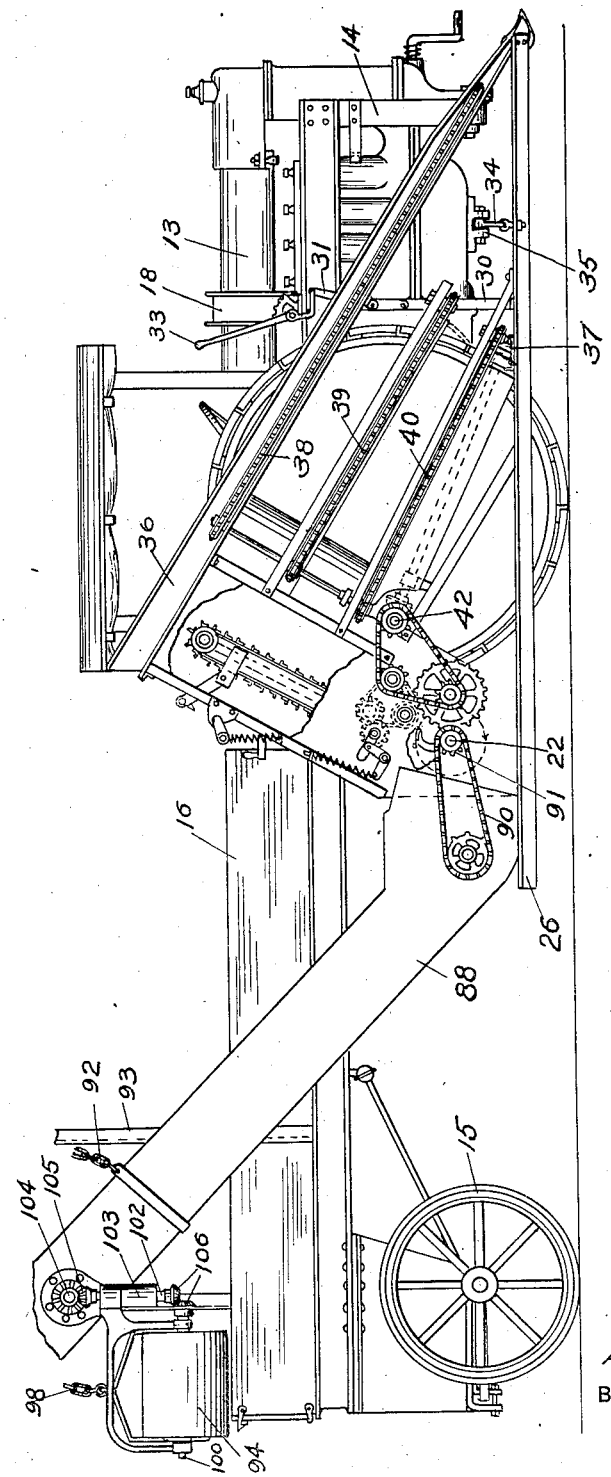

1,815,273

UNITED STATES PATENT OFFICE

ADOLPH RONNING, OF MINNEAPOLIS, AND ANDREAN G. RONNING, DECEASED, LATE OF MINNEAPOLIS, MINNESOTA, BY ADOLPH RONNING AND JACOB A. RONNING, BOTH OF MINNEAPOLIS, MINNESOTA, EXECUTORS

COMBINATION TRACTOR IMPLEMENT

Original application filed July 5, 1924, Serial No. 724,442. Divided and this application filed December 19, 1928. Serial No. 327,137.

This invention relates to farm implements and the primary object is to provide an efficient and practical type of combination tractor-harvester in which the harvester is disposed at one side of and carried by the tractor so that it may be conveniently kept under observation and control by the tractor operator. A further object is to provide a combination tractor harvester with an improved and novel conveyor system for conveying and distributing the harvested crop. These and other objects will be disclosed in the course of the following specification, reference being had to the accompanying drawings, in which:

Fig. 1 is a plan view of the machine with parts removed or broken away for purpose of illustration.

Fig. 2 is a right side elevation of the machine, with parts broken away.

Fig. 3 is a rear view of the machine with various parts broken away or removed.

Fig. 4 is a detail sectional elevation as on the line 4—4 in Fig. 3.

Fig. 5 is a detail view of the upper end of the carrier mechanism.

Fig. 6 is a detail view as seen from the right in Fig. 5, fractional portions being broken away.

This application is a division of application Serial No. 724,422, filed July 5, 1924, for harvester.

Referring to the drawings by reference characters, 12 designates an auxiliary frame which is secured to a tractor 13, a yoke 14 of the frame being substituted for the steering truck 15, which is then applied to the rear end of the frame, as more fully described in a co-pending application, Serial No. 717,511. The rear part of the frame 12 supports a wagon box or container 16, and forwardly thereof is secured a pair of transverse cross bars or beams 17 and 18, which project, at their right ends, laterally from the frame and beyond the tractor to form suitable main supports for the harvester.

The outer end of the beam 17 is provided, as shown especially in Figs. 1, 3 and 4, with a pair of spaced depending yokes 19 having arcuate guide slots 20, in which is adjustably guided a bearing member 21 in which is journaled the main harvester drive shaft 22. The inner end of the shaft 22 has a pulley 23 which is driven by a belt 24 from the usual power pulley 25 of the tractor. The harvester frame 26 is rigidly secured upon the outer end of the member 21 and is braced by suitable means such as brace rods 27. The vertical adjustment of the member 21, and also the harvester frame and pulley 23, is effected by means of a vertical bar 28 whose lower end is rigidly connected to the member 21, while its upper end is threaded and screws into a hand wheel 29, which is rotatably secured on the beam 17. Thus the rear end of the harvester may be adjusted vertically without interfering with the transmission of power thereto from the tractor. The front end of the harvester is carried or supported by a link 30 which connects it to the crank 31 of a shaft 32 having an adjustably secured hand lever 33, the shaft 32 being arranged on the outer end of the beam 18, so that the front end of the harvester may also be vertically adjusted, as may be desired under various circumstances. The front end of the harvester is braced against and properly spaced away from the tractor 13 by a link bar 34, the inner end of which may be conveniently secured to the tractor as at 35, at which place the radius rods of the steering truck were formally secured.

The harvester proper includes a pair of gathering frames 36, between which is received the standing stalks of corn, a stalk cutting sickle 37, for severing the stalks, and gathering chains 38, 39 and 40, for conveying the severed stalks upwardly and rearwardly over a floor member 41 to the ensilage cutting mechanism. The chains and sickle are operated by suitable means from a shaft 42, but such means and the general details in construction of the gathering mechanism have been described in a general way in U. S. Patent No. 1,340,461, issued May 18, 1920, and as the feeding and cutting mechanisms here employed are fully disclosed and described in the parent application Ser. No. 724,422, such devices and mechanisms will not here be described in detail, it being sufficient to state that as the machine moves forward over the standing row of corn, cane or other row crop, such crop is gathered in, severed from the ground, fed down into an ensilage cutter, where it is cut into small particles, and from which cutter it is delivered or discharged into the lower end of a rearwardly inclined, laterally disposed conveyor casing 88, in which is mounted an endless carrier 89, driven by a sprocket chain 90 from a pinion 91 on the drive shaft 22. The upper end of the conveyor is adjustably supported by a chain 92 which is detachably secured, for adjustment, to a bracket arm 93 which extends up from the container or box 16. The lower run of the endless carrier moves upwardly, and in doing so engages the cut ensilage and moves it upwardly over the floor of the conveyor 88 to its upper end, where the ensilage is dropped upon a second or horizontal conveyor 94, having an endless carrier 95. This conveyor is preferably long enough so that it will extend, when in a transverse position, beyond the truck box 16 (Figs. 1 and 6), and thus permit the ensilage to be delivered into an auxiliary wagon or truck (not shown) on the left or stubble side of the machine, which is especially desirable when the box 16 has been filled. The box 16 is filled either by swinging the outer or left end of the conveyor 94 to the front end of the box, or by providing the floor 96 (under the upper run of the carrier 95) with a removable trap door 97. One end of the transverse conveyor is adjustably supported by a chain 98 from a bracket arm 99, while the other end is pivotally supported on the carrier (95) drive shaft 100, which is journaled in a yoke 101, mounted on a vertical pivot consisting of a shaft 102 journaled in a casting 103 secured to the inclined conveyor 88. The vertical shaft 102 is driven by the shaft 104 of the upper end of the carrier 89, by bevel pinions 105, and in turn drives the shaft 100 by means of bevel pinions 106. Thus the carrier 95 is simultaneously driven with and by the carrier 89 regardless of the shifted or adjusted position of the conveyor 94.

From the foregoing description, reviewed in connection with the accompanying drawings, it will be seen that the tractor operator, by manipulation the control members 29 and 33 is able to vertically adjust either or both ends of the harvester unit proper, to meet varying conditions and requirements; that power is efficiently transmitted from the engine of the tractor to the harvester by a simple mechanism that readily accommodates itself to relative adjustments of the tractor and harvester; that the harvester being carried by the tractor or as of a unit therewith, dispenses with the necessity of furnishing separate ground support and adjustments, and permits of a simple and efficient manner of controlling and steering it over the field; and that by embodying the tractor, harvester, conveyor and receiving receptacle features all in one single unit machine, the operator can utilize his own efforts and the tractor engine power to perform several tasks at one time and with a minimum effort. Thus, a farmer equipped with this machine, is enabled, single-handed if necessary, to cut his crop and bring it to the silo with maximum speed and efficiency. If he has an additional truck or wagon unit to put on the job it can be used to haul the ensilage, and between trips of such wagon or truck he does not have to shut down the machine, but can go on, filling up the receptacle 16, emptying it only as occasion may require. Even where there are enough separate vehicles to carry the normal flow of ensilage being cut the receptacle 16 is by no means useless as it can be used to receive the crop after one truck or wagon has pulled away and until the next one is in position. Thus, there is no need to stop the tractor at any time between loadings and consequently a great deal of time is saved.

It is understood that suitable modifications may be made in the general design and structural details of the invention as herein shown, provided, however, that said modifications come within the spirit and scope of the appended claims. Having now therefore fully shown and described my invention what I claim to be new and desire to protect by Letters Patent is:

1. The combination including a tractor, a harvester supported by the tractor and disposed at the side thereof, and means for mounting the harvester to the tractor comprising devices for vertically adjusting either or both ends of the harvester.

2. The combination with a tractor having a container carried rearwardly thereof, of a harvester arranged at one side of the tractor and operatively connected with the power unit thereof, an inclined conveyor for conveying material upwardly and rearwardly from the harvester, and a second conveyor arranged to receive material from the first mentioned conveyor and deliver such material beyond the opposite side of the container, said second conveyor having means whereby the material conveyed thereby may be released to drop into the container.

3. The combination including a tractor, a harvester disposed adjacent to the tractor and operatively connected therewith, a conveyor extending upwardly and rearwardly from the harvester, a second conveyor extending transversely from the first mentioned conveyor, and means for vertically adjusting the conveyors.

4. The combination including a tractor, a harvester disposed adjacent to the tractor and operatively connected therewith, a conveyor extending upwardly and rearwardly from the harvester, a second conveyor extending transversely, from the first mentioned conveyor, and means for mounting the second conveyor whereby it may be swung on a pivot with respect to the other conveyor.

5. The combination including a tractor, a harvester disposed adjacent to the tractor and operatively connected therewith, a conveyor extending upwardly and rearwardly from the harvester, a second conveyor extending transversely, from the first mentioned conveyor, and means for driving the second conveyor from the first conveyor.

6. The combination with a tractor having a belt pulley, of a harvester disposed at one side of the tractor, vertically adjustable means supporting the harvester, said means including a drive shaft having a pulley, and a belt connecting both of said pulleys.

7. The combination with a tractor, of a frame secured thereto and extending rearwardly therefrom, a container on the frame, a harvester carried at the side of the tractor, a conveyor extending rearwardly and upwardly from the harvester, a second conveyor extending from the upper end of the first conveyor and transversely with respect to the container.

8. The combination with a tractor, of a frame secured thereto and extending rearwardly therefrom, a container on the frame, a harvester carried at the side of the tractor, a conveyor extending rearwardly and upwardly from the harvester, a second conveyor extending from the upper end of the first conveyor and transversely with respect to the container, and means for transmitting power from the tractor engine to the harvester and to both of the conveyors.

Signed at Minneapolis, Minnesota, this 17th day of December, 1928:

ADOLPH RONNING,
*Joint Inventor.*
ADOLPH RONNING,
JACOB A. RONNING,
*Joint Executors of the Estate of Andrean G. Ronning, Deceased.*